Dec. 18, 1956 JEAN-MARIE MOULON 2,774,826

STABILIZED TRANSISTOR AMPLIFIER

Filed April 10, 1953 2 Sheets-Sheet 1

Dec. 18, 1956 JEAN-MARIE MOULON 2,774,826

STABILIZED TRANSISTOR AMPLIFIER

Filed April 10, 1953 2 Sheets-Sheet 2

United States Patent Office 2,774,826

Patented Dec. 18, 1956

2,774,826

STABILIZED TRANSISTOR AMPLIFIER

Jean-Marie Moulon, Paris, France

Application April 10, 1953, Serial No. 348,089

Claims priority, application France June 23, 1952

4 Claims. (Cl. 179—171)

The present invention relates to stabilized transistor type amplifiers and more particularly to circuits for biassing amplifying transistors without affecting their stability of amplification.

In the present specification, the word "transistor" designates a three-electrode, semi-conducting amplifying element the three electrodes of which will be called: emitter, collector and base electrodes.

Various devices have been previously described which enable the energizing and biassing of transistors by means of a single source of D. C. voltage. These devices include, in the base electrode circuit, an impedance which is detrimental from the stability standpoint. Stability is then obtained by means of an arrangement which consists in inserting a resistance in the collector circuit and which, unfortunately, increases considerably the power consumed by the amplifier, as will be shown later.

The object of the present invention is to provide circuits comprising one or more amplifying transistors in which the said transistors are power supplied and biassed from a single D. C. source, in such a manner that the impedance inserted in the base electrode circuit, at the lowest frequencies in the frequency band of the signals to be amplified, as compared with the resistance of the input circuit, is low enough not to destroy the transistors' stability, this result being obtained at the cost of a minute increase in the power consumed.

Another object of this invention is to provide transistor type amplifiers with one or more stages, comprising positive and negative feedback circuits the stability conditions of which are readily fulfilled.

Finally, if a slight additional power consumption is permissible, the biassing device, which is an object of the invention, makes it possible to preserve a bias which is nearly independent of the individual transistor used, and, at the same time, to have a gain independent of the possible variations in voltage of the power supply source.

According to the invention there is provided a stabilized amplifier comprising a transistor having a base electrode, an emitter electrode and a collector electrode, a direct-current source for supplying power to said transistor, a potentiometer having two fixed terminals and an adjustable sliding contact, means connecting one of said terminals to said base electrode, an input circuit connecting said emitter electrode to the other of said terminals, means connecting said sliding contact to the positive terminal of said source, an output circuit connecting the negative terminal of said source to said collector electrode and two condensers having a low impedance at the frequencies of the signals to be amplified by said amplifier and respectively connected between said two fixed terminals and said sliding contact and negative terminal.

According to the invention there is also provided a multi-stage amplifier including a number of cascade-connected transistor stages, each of which is arranged in a way similar to that just described for the case of the one-stage amplifier, the said multi-stage amplifier further including arrangements allowing its transistors to be biassed from a common direct-current source and adjustable means making it possible to take into account the variations in the characteristics of the individual transistors.

The invention will be described in detail, hereinafter, with reference to the appended drawings, wherein.

Figure 1:
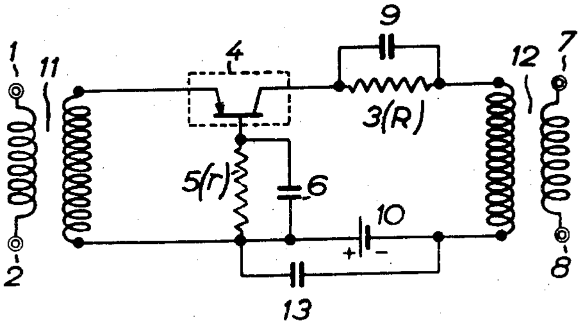
Figure 1 shows a transistor amplifier of the prior art.

Referring to Figure 1, there is shown a transistor 4 the emitter of which is indicated by an arrow, two transformers, 11 and 12 (input and output transformers), a biassing resistance 5 in the base electrode circuit, a condenser 6 in shunt across said resistance 5, and a stabilizing resistance 3, in the collector circuit, shunted by the condenser 9. The power supply and biassing source 10 is shunted by a condenser 13. The input terminals to the amplifier formed by the transistor are designated by 1 and 2, the output terminals by 7 and 8.

The above reference numerals, when repeated in other figures designate the same elements as in Figure 1.

The stability of a transistor is ensured when at least one of the output and input circuits is open. On the contrary, the stability is at a minimum when these two circuits are closed on a low impedance. The transformers 11 and 12 offer a very low D. C. impedance and the stability of the amplifier in Figure 1 is at a minimum at low frequencies, the transformers then behaving as effective short circuits.

The stability condition, in short circuit, of a transistor defined by its impedance matrix $$\begin{Vmatrix} R_{11} & R_{12} \\ R_{21} & R_{22} \end{Vmatrix}$$

may be written:

$$\delta=\frac{R_{12}R_{21}}{R_{11}R_{22}}<1$$

in which, in accordance with usual notations, $R_{11}$ is the resistance of the emitter-base electrode circuit when the collector-base electrode circuit is open, $R_{22}$ is the resistance of the collector-base electrode circuit when the emitter-base electrode circuit is open, and $R_{12}$ and $R_{21}$ are quantities having the physical dimensions of resistances, and which depend on the mutual action between the two circuits just mentioned.

A transistor of the usual type has, for instance, as an impedance matrix:

$$\begin{Vmatrix} 200 & 100 \\ 20{,}000 & 10{,}000 \end{Vmatrix} \text{ ohms}$$

Figure 3:
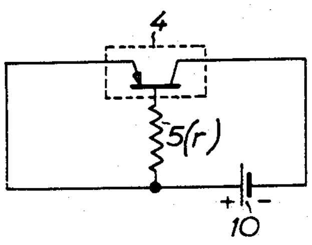
Figures 3 to 5 show the equivalent diagrams, at low frequencies, for an amplifier of the prior art in Figure 3, for a stabilized amplifier of the prior art in Figure 4 (that of Figure 1) and for a stable amplifier according to the invention in Figure 5 (that of Figure 2)

The amplifier of Figure 1, if resistance 3 is omitted, simplifies down, at low frequencies, to the circuit shown in Fig. 3.

The resistance 5, for instance, has a value $r$ of 200 ohms, and the usual values for direct currents are, for example, 1 milliampere in the emitter and 3 milliamperes in the collector. This resistance $r$ adds to each term in the matrix of the transistor and we have:

$$(1)\quad \delta_{(\text{Fig. 3})}=\frac{(100+r)(20{,}000+r)}{(200+r)(10{,}000+r)}=\frac{300\times 20{,}200}{400\times 10{,}200}=1.47$$

and the instability is certain.

The amplifier in Figure 1 is stabilized by resistance 3 of value R. The diagram of the amplifier at low frequencies, becomes that of Figure 4 and we have $$\delta_{(\text{Fig. 4})}=\frac{300\times 20{,}200}{400\times(10{,}200+R)}$$

Figure 4:
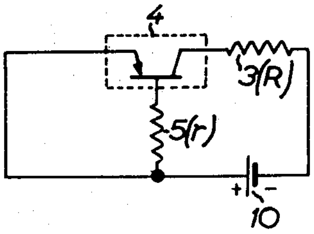

Stability requires that in the case of Figure 4, $\delta$ be lower than 1, i. e. $R=4{,}950$ ohms.

A resistance R equal to 5,000 ohms with a current of three milliamperes then dissipates 45 milliwatts which is not acceptable, the power dissipated by the transistor not equipped with the resistance R being less than 100 milliwatts and this low power consumption being one of the main advantages of the transistor type amplifier.

According to the invention (Figure 2), the collector being connected to the negative terminal of the source 10, as usual, through the load impedance of the collector circuit (primary winding of the transformer 12), the positive terminal of the source is connected with the slide of a potentiometer 14—15, one end of said potentiometer being connected to the base electrode of the transistor while the other end is connected with the lower portion of the secondary winding of the transformer 11. A condenser 16 is in shunt across the potentiometer, the reactance of said condenser being taken with a low value for the signals to be amplified. A second condenser 13, also having a low reactance, connects the negative terminal of source 10 to the base electrode of transistor 4. The said negative terminal is connected to the collector electrode of transistor 4 through the primary winding of transformer 12. Let $R_2$ and $R_1$, respectively, be the values of the resistances of the portions 14 and 15 of the potentiometer.

Figure 2:
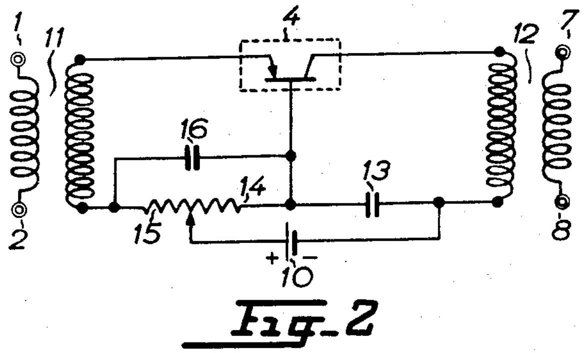
Figure 2 shows an amplifying transistor power supplied and biassed in accordance with the invention.
Figure 5:
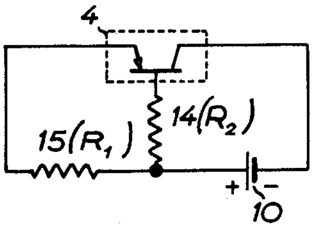

At low frequencies, the diagram of the amplifier in Figure 2 becomes that of Figure 5 and $$(2)\qquad \delta_{(\text{Fig. 5})}=\frac{(100+R_2)(20{,}000+R_2)}{(200+R_2+R_1)(10{,}000+R_2)}$$

It is then the resistance $R_1$ which ensures stability.

To keep the transistor bias equal in the cases of Figures 1 and 2, it is important to preserve the same value for the ratio of the currents in the emitter circuit and in the base electrode circuit so as to create identical voltage drops in the two circuits, once the minimum resistance $r$ ensuring the proper ratio has been placed in the base electrode circuit. Since the current through the emitter circuit is less than the current in the base electrode circuit, the resistance defining a given voltage drop in the emitter circuit increases more rapidly than the resistance defining the same drop in the base electrode circuit.

Thus, while increasing $r$ in Expression 1 was unfavourable, it is favourable, on the contrary, to increase $R_2$ in Expression 2 since the corresponding value for $R_1$ increases more rapidly, which stabilizes the amplifying transistor.

Repeating the example given above, of a 1 milliampere in the emitter circuit, a 3 milliampere current in the collector circuit and consequently a 2 milliampere current in the base electrode circuit and assuming: $R_1=400$ ohms, we should take $$R_2=R_1\times\frac{1\text{ ma.}}{2\text{ ma.}}+200=400\text{ ohms}$$

and $$\delta_{(\text{Fig. 2})}=\frac{500\times 20{,}400}{1000\times 10{,}400}=0.98<1$$

Stability is thus ensured and the power dissipated in $R_1$ and $R_2$ is of the order of 2 milliwatts, i. e. very much less than the 45 milliwatts necessary for stabilizing the amplifier of Figure 1 by means of the resistance R. The amplifier which is an object of the invention draws less energy, for an equal stability, than amplifiers of the prior art.

It is possible also to obtain a very high stability by increasing $R_1$ and $R_2$ without reaching prohibitive dissipated powers.

Taking for instance a 6000 ohm potentiometer with $R_1=4000$ ohms and $R_2=2000$ ohms, with the same respective currents of 1 milliampere and 2 milliamperes in the emitter circuit and base electrode circuit respectively, there is found $\delta=0.62$. Stability, therefore, is very good and the undesirable feedback rate very small; the corresponding energy dissipated in the potentiometer is only 10 milliwatts.

Experience has further shown that the use of a potentiometer of the order of 5000 to 6000 ohms would result in another important advantage, besides stability: the D. C. resistances of the emitter and collector circuits of the transistors then becoming negligible as compared to $R_1$ and $R_2$, the current distribution then depends only on the latter resistances, and a transistor may be replaced by another, very dissimilar one, the biassing current distribution varying very little. The well-known difficulty of reproducing identical transistors makes the latter property very important and this is accentuated by the fact that a variation in the power supply voltage results, of course, in a variation of the total current (collector); but the ratio of the currents in the emitter and base electrode circuits remaining unchanged, the transistor bias remains at a suitable value.

The biassing device of the invention can thus be used with low values of the potentiometer resistances, adjustable for each transistor, for obtaining a stable amplifier with a very low power consumption. It can also be used with higher and fixed values for obtaining a very stable amplifier, with a power consumption much lower than that of known amplifiers and less sensitive to changes due to transistor replacement.

The amplifying circuits according to the invention thus make it possible to obtain multi-stage transistor type amplifiers comprising positive or negative feedback circuits without encountering stability conditions too hard to achieve (contrary to the case when each stage already comprises its own important feedback due to a high impedance in the base electrode circuit).

Figure 6:
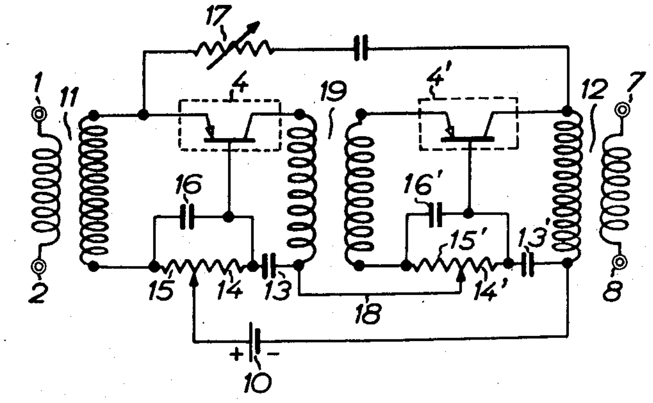
Figure 6 shows a two stage transistor type amplifier comprising a negative feedback circuit.

An example of a two stage transistor amplifier is shown in Figure 6. This amplifier comprises two stages of the type of Figure 2. The primed reference numerals designate the same elements for the second stage as those designated by the unprimed reference numerals in the first stage. The sliding contact of potentiometer 14 is connected to the positive terminal of the battery 10 and the negative terminal of this same battery is connected with the collector of transistor 4'. Further, the collector of transistor 4 is connected through the lead 18 to the sliding contact potentiometer 14'. The transformer 19 linking the two stages has its windings connected in such directions that it causes a 180° phase shift in the transmitted signal.

The collector of the stage 4' is connected with the emitter of the stage 4 through an adjustable negative feedback resistance 17 in series with a condenser avoiding the transmission of D. C. power supply voltages.

The gain of the assembly without any negative feedback (resistance 17 infinite) varies, according to transistor samples from 4 to 5.5 nepers (1 neper equals 8.68 decibels). The common power supply current is 4 milliamperes, it allows an output level higher than 1 milliwatt. The power consumed is less than 200 milliwatts.

The negative feedback resistance 17 may be adjusted until precisely the desired gain (most often less than 3 nepers) is obtained.

The negative feedback rate is then higher than 1 neper, and strongly stabilizes the amplifier which becomes insensitive to important variations in the voltage of the power supply source; further, particular transistors may be replaced by other transistor samples, of the same type without any appreciable variation in gain.

The amplifier described in connection with Figure 6 may be used successfully as an amplifier for a four-wire telephone circuit repeater.

I claim:

1. A stabilized two-stage transistor amplifier, adapted to be power-supplied from a single direct-current source, comprising an input circuit and a two winding interstage transformer, first and second amplifying stages each including a transistor having a base electrode, an emitter electrode and a collector electrode, each of said stages further including a potentiometer having an adjustable sliding contact and two fixed terminals and first and second condensers both of low impedance at the frequencies of the currents to be amplified by said amplifier, said first condenser being connected across said two fixed terminals, each of said stages further comprising a direct connection between one of said fixed terminals and the base electrode of the transistor of said stage, means in said first stage for connecting the emitter electrode of the transistor thereof to the other of said fixed terminals of the potentiometer thereof through said input circuit, means for connecting the collector electrode of the transistor of said first stage through a first winding of said transformer in series with said second condenser of said first stage to the base electrode of the transistor of said first stage, means in said second stage for connecting the emitter electrode of the transistor thereof to the fixed terminal of the potentiometer thereof other than that connected to the base electrode of the same said transistor through the second winding of said transformer, means for connecting the collector electrode of the transistor of said second stage through said output circuit in series with said second condenser of said second stage to the base electrode of the transistor of said second stage, means for connecting the positive terminal of said direct current source to the sliding contact of the potentiometer of said first stage, means for connecting the negative terminal of said source to the collector electrode of the transistor of said second stage through said output circuit and a direct connection between the sliding contact of the potentiometer of said second stage and said first winding of said transformer.

2. An amplifier as claimed in claim 1, wherein feedback is provided through an impedance connected between the emitter electrode of said first transistor and the collector electrode of said second transistor.

3. A stabilized multi-stage transistor amplifier, adapted to be power-supplied from a single direct current source, comprising a plurality of cascade-connected stages, each including a transistor having a base electrode, an emitter electrode and a collector electrode, wherein the collector electrode circuit of the transistor pertaining to all but the one of said stages is coupled through a two-winding transformer to the emitter electrode circuit of the transistor pertaining to the following stage, and wherein the base electrode-emitter electrode circuit of the transistor of each one of said stages includes a potentiometer having a sliding contact and two fixed terminals, the latter respectively connected to the emitter electrode circuit and to the base electrode of same said transistor, each one of said stages further including first and second condensers both having a low impedance at the frequencies of the currents to be amplified by said amplifier, said first condenser being connected across said two fixed terminals of said potentiometer and said second condenser being connected between the base electrode of the transistor of said one of said stages and the collector electrode circuit of same said transistor, said sliding contact of all but the first one of said stages being connected to the collector electrode circuit of the transistor of the preceding stage and said direct current source being connected by the positive terminal thereof to the sliding contact of the potentiometer of said first stage and by the negative terminal thereof to the collector electrode circuit of the transistor of said last stage, said amplifier having an input circuit constituted by the emitter electrode circuit of the transistor of said first stage and an output circuit constituted by the collector electrode circuit of the transistor of said last stage.

4. An amplifier as claimed in claim 3, wherein feedback is provided through an impedance connected between the emitter electrode of the transistor of said first stage and the collector electrode of the transistor of said last stage.

References Cited in the file of this patent

UNITED STATES PATENTS

| | | |
|---|---|---|
| 2,585,077 | Barney | Feb. 12, 1952 |
| 2,647,957 | Mallincrodt | Aug. 4, 1953 |
| 2,647,958 | Barney | Aug. 4, 1953 |
| 2,663,766 | Meacham | Dec. 22, 1953 |

OTHER REFERENCES

Terman text: "Radio Engineering," 3rd ed., p. 324, pub. 1947 by McGraw Hill Book Co., Inc., New York, N. Y.

Bell text: "The Transistor," pp. 153–155, 183–188, 370, pub. 1951 by Bell Tel. Labs., Murray Hill, N. J.